United States Patent
Al-Zahrani

(10) Patent No.: US 10,919,135 B2
(45) Date of Patent: Feb. 16, 2021

(54) SYSTEMS AND METHODS FOR STEAM RING HEATING FOR BEARING REMOVAL FROM SHAFT

(71) Applicant: Saudi Arabian Oil Company, Dhahran (SA)

(72) Inventor: Rakan Saeed Al-Zahrani, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 385 days.

(21) Appl. No.: 15/927,394

(22) Filed: Mar. 21, 2018

(65) Prior Publication Data

US 2019/0291251 A1 Sep. 26, 2019

(51) Int. Cl.
| | | |
|---|---|---|
| *B25B 27/06* | (2006.01) | |
| *F16C 35/06* | (2006.01) | |
| *F16C 35/078* | (2006.01) | |
| *F16C 35/063* | (2006.01) | |
| *F16C 19/06* | (2006.01) | |

(52) U.S. Cl.
CPC .......... *B25B 27/064* (2013.01); *F16C 35/062* (2013.01); *F16C 35/078* (2013.01); *F16C 19/06* (2013.01); *F16C 35/063* (2013.01); *F16C 2226/12* (2013.01); *F16C 2226/14* (2013.01); *F16C 2300/02* (2013.01)

(58) Field of Classification Search
CPC .......... F16C 13/02; F16C 19/06; F16C 19/38; F16C 19/54; F16C 2226/12; F16C 2226/14; F16C 23/086; F16C 2300/02; F16C 2322/12; F16C 35/06; F16C 35/062; F16C 35/063; F16C 35/078
See application file for complete search history.

(56) References Cited

U.S. PATENT DOCUMENTS

| | | |
|---|---|---|
| 1,843,463 A | 2/1932 | Tawresey |
| 2,841,244 A | 7/1958 | Sorem |
| 3,108,839 A | 10/1963 | Johnson |

(Continued)

FOREIGN PATENT DOCUMENTS

| | | | |
|---|---|---|---|
| DE | 553124 | 6/1932 | |
| DE | 553124 C * | 6/1932 | .............. F16C 13/02 |

(Continued)

OTHER PUBLICATIONS

International Search Report and Written Opinion for related PCT application PCT/US2019/023454 dated Jun. 28, 2019.

(Continued)

*Primary Examiner* — Joseph J Hail
*Assistant Examiner* — Arman Milanian
(74) *Attorney, Agent, or Firm* — Bracewell LLP; Constance G. Rhebergen; Linda L. Morgan

(57) ABSTRACT

Systems and methods for removing a bearing assembly from a shaft include a steam ring, the steam ring being a ring shaped member. The steam ring has an inner bore sized to circumscribe the shaft. A lip ring extends from a first end face of the steam ring and has an inner diameter length that is greater than an outer diameter length. A steam inlet port extends through a sidewall of the steam ring. A steam outlet port extends through the sidewall of the steam ring at a location spaced apart from the steam inlet port.

14 Claims, 4 Drawing Sheets

(56) References Cited

U.S. PATENT DOCUMENTS

|  |  |  |  |  |
|---|---|---|---|---|
| 3,679,277 | A |  | 7/1972 | Dohmen |
| 4,592,666 | A | * | 6/1986 | Jornhagen ............ F16C 33/7813 |
| 5,140,666 | A | * | 8/1992 | Lamb .................... B23P 11/025 |
|  |  |  |  | 29/447 |
| 9,036,987 | B2 | * | 5/2015 | Neumann ............ H05B 3/0061 |
|  |  |  |  | 392/427 |
| 2011/0226757 | A1 | * | 9/2011 | David ...................... C21D 9/40 |
|  |  |  |  | 219/635 |
| 2015/0226265 | A1 | * | 8/2015 | Bourgeois ............. F16C 35/042 |
|  |  |  |  | 414/800 |

FOREIGN PATENT DOCUMENTS

| DE | 1744796 U | 5/1957 |
| DE | 102005059982 B3 | 7/2007 |
| FR | 547858 A | 12/1922 |
| JP | 2010091005 | 4/2010 |
| WO | 2015120092 A1 | 8/2015 |

OTHER PUBLICATIONS

SKF, "SKF Induction Heaters" PUB MP/P8 10921/2 EN, Aug. 2017, pp. 1-8.

* cited by examiner

SYSTEMS AND METHODS FOR STEAM RING HEATING FOR BEARING REMOVAL FROM SHAFT

BACKGROUND OF THE DISCLOSURE

1. Field of the Disclosure

The present disclosure relates to bearing assemblies, and more specifically, the disclosure relates to reducing the magnitude of force required for removing a bearing from a shaft.

2. Description of the Related Art

Rotating shafts in industrial facilities can be fit with bearings to allow for relative rotation between the shaft and related equipment. The bearing can be interference fit on the shaft so that the bearing inner race remains static relative to the shaft, while the outer race of the bearing rotates. If the bearing needs to be removed from the shaft for maintenance or replacement, it can be a challenge to remove the bearing without damaging the bearing or shaft. In addition to the tight fit of the bearing on the shaft, dirt and debris may have built up over time on the shaft or in the bearing that inhibits the removal of the bearing from the shaft.

SUMMARY OF THE DISCLOSURE

Current systems for removing a bearing from a shaft include heating the bearing with a torch or using mechanical methods such as pullers or wedges. However, such methods can damage both the shaft and the bearing. Systems and methods of this disclosure utilize a steam ring as a heating source and for removing dust and debris in order to reduce the amount of force required to pull the bearing from the shaft. Embodiments of this disclosure utilize the steam to heat and expand the inner race of the bearing. The steam ring is portable, can be utilized to heat the inner race within less than ten minutes, and can be used throughout the industrial facility where a steam source is readily available.

In an embodiment of this disclosure a system for removing a bearing assembly from a shaft includes a steam ring, the steam ring being a ring shaped member. The steam ring has an inner bore sized to circumscribe the shaft. A lip ring extends from a first end face of the steam ring and has an inner diameter length that is greater than an outer diameter length. A steam inlet port extends through a sidewall of the steam ring. A steam outlet port extends through the sidewall of the steam ring at a location spaced apart from the steam inlet port.

In alternate embodiments the system can further include a seal ring, the seal ring positioned around an inner diameter of the steam ring and sized to contact the shaft. The steam inlet port can extend from a second end face of the steam ring opposite the first end face, to the inner bore. At least one securing member can extend through the sidewall of the steam ring and engage the shaft, preventing relative movement between the steam ring and the shaft. A pressure gauge can be secured to the A steam circulation path can extend around an inner diameter of the steam ring.

In an alternate embodiment of this disclosure, a system for removing a bearing assembly from a shaft includes a steam ring, the steam ring being a ring shaped member and having an inner bore circumscribing the shaft. A lip ring extends from a first end face of the steam ring, the first end face having an outer face surface radially outward of the lip ring and an inner face surface radially inward of the lip ring. The lip ring and the inner face surface define a steam circulation path along an inner race of the bearing assembly. A steam inlet port extends through a sidewall of the steam ring to the steam circulation path. A steam outlet port extends from the steam circulation path through the sidewall of the steam ring at a location spaced apart from the steam inlet port. A steam source is connected to the steam inlet port.

In alternate embodiments, the system can further include a seal ring located around the inner face surface and sized to contact the shaft. The outer face surface and the inner face surface can be unaligned with the lip ring having an inner diameter length that is greater than an outer diameter length. At least one securing member can extend through the sidewall of the steam ring and engage the shaft, preventing relative movement between the steam ring and the shaft. A pressure gauge can be secured to the steam inlet port and operable to measure a pressure of a steam entering the steam inlet port.

In yet another alternate embodiment of this disclosure, a method for removing a bearing assembly from a shaft includes circumscribing the shaft with a steam ring, the steam ring being a ring shaped member. The steam ring has an inner bore. A lip ring extends from a first end face of the steam ring and has an inner diameter length that is greater than an outer diameter length. A steam inlet port extends through a sidewall of the steam ring. A steam outlet port extends through the sidewall of the steam ring at a location spaced apart from the steam inlet port. Steam is provided to the steam inlet port to heat the bearing assembly.

In alternate embodiments, the method can further include sealing an inner diameter of the steam ring with a seal ring positioned around the inner diameter of the stem ring and sized to contact the shaft. The steam inlet port can extend from a second end face of the steam ring opposite the first end face, to the inner bore. Relative movement between the steam ring and the shaft can be prevented with at least one securing member extending through the sidewall of the steam ring and engaging the shaft. A pressure of a steam entering the steam inlet port can be monitored with a pressure gauge secured to the steam inlet port. A steam circulation path can extend around an inner diameter of the steam ring, where the steam provided to the steam inlet port travels through the steam circulation path to the outlet port.

BRIEF DESCRIPTION OF THE DRAWINGS

So that the manner in which the features, aspects and advantages of the embodiments of this disclosure, as well as others that will become apparent, are attained and can be understood in detail, a more particular description of the disclosure may be had by reference to the embodiments thereof that are illustrated in the drawings that form a part of this specification. It is to be noted, however, that the appended drawings illustrate only certain embodiments of the disclosure and are, therefore, not to be considered limiting of the disclosure's scope, for the disclosure may admit to other equally effective embodiments.

DETAILED DESCRIPTION

The disclosure refers to particular features, including process or method steps. Those of skill in the art understand that the disclosure is not limited to or by the description of embodiments given in the specification. The subject matter of this disclosure is not restricted except only in the spirit of the specification and appended Claims.

Those of skill in the art also understand that the terminology used for describing particular embodiments does not limit the scope or breadth of the embodiments of the disclosure. In interpreting the specification and appended Claims, all terms should be interpreted in the broadest possible manner consistent with the context of each term. All technical and scientific terms used in the specification and appended Claims have the same meaning as commonly understood by one of ordinary skill in the art to which this disclosure belongs unless defined otherwise.

As used in the Specification and appended Claims, the singular forms "a", "an", and "the" include plural references unless the context clearly indicates otherwise.

As used, the words "comprise," "has," "includes", and all other grammatical variations are each intended to have an open, non-limiting meaning that does not exclude additional elements, components or steps. Embodiments of the present disclosure may suitably "comprise", "consist" or "consist essentially of" the limiting features disclosed, and may be practiced in the absence of a limiting feature not disclosed. For example, it can be recognized by those skilled in the art that certain steps can be combined into a single step.

Where a range of values is provided in the Specification or in the appended Claims, it is understood that the interval encompasses each intervening value between the upper limit and the lower limit as well as the upper limit and the lower limit. The disclosure encompasses and bounds smaller ranges of the interval subject to any specific exclusion provided.

Where reference is made in the specification and appended Claims to a method comprising two or more defined steps, the defined steps can be carried out in any order or simultaneously except where the context excludes that possibility.

Figure 1:
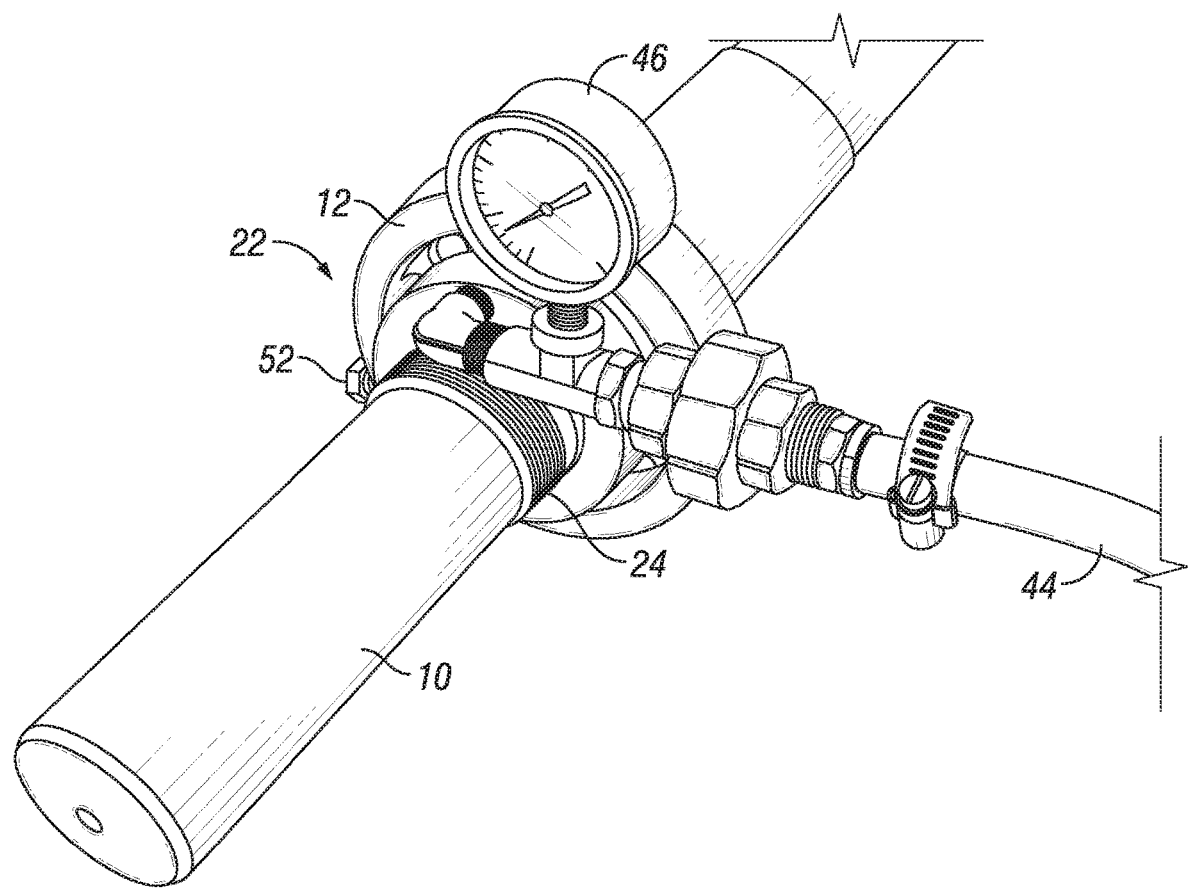
FIG. 1 is a perspective view of a steam ring located on a shaft with a bearing, in accordance with an embodiment of this disclosure.
Figure 2:
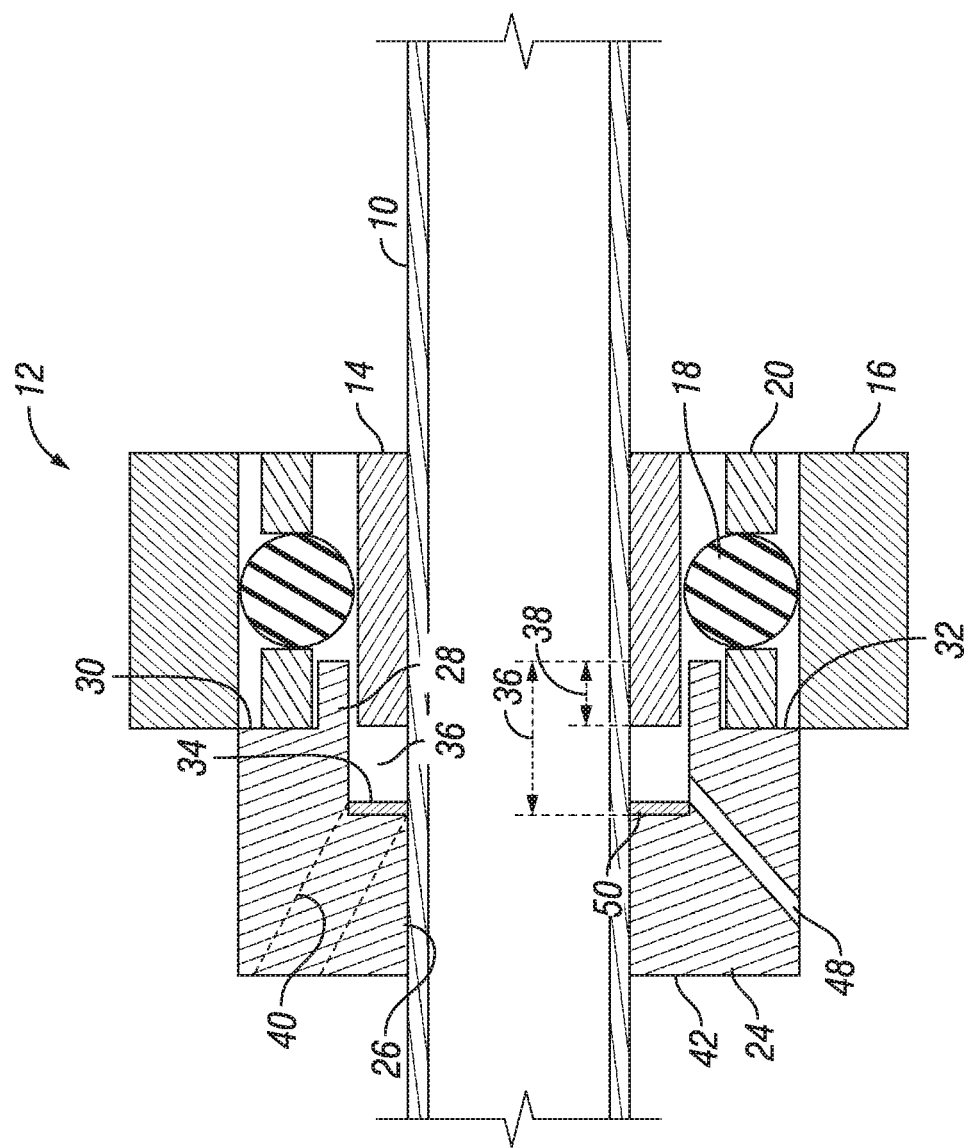
FIG. 2 is a section view of a steam ring located on a shaft with a bearing, in accordance with an embodiment of this disclosure.

Looking at FIGS. 1-2, shaft 10 can be a rotating shaft used in an industrial process. Shaft 10 can be the spine of any rotating equipment such as, for example, a pump, motor, or compressor. Bearing assembly 12 can be fit on shaft 10. Bearing assembly 12 can be used to allow for relative rotation between shaft 10 and an associated piece of equipment. Bearing assembly 12 is a main connector between shaft 10 and the body or casing of the equipment to ensure the alignment and position of shaft 10 and allowing for shaft 10 to rotate relative to the body or casing of the equipment. Bearing assembly 12 can have an inner diameter that is sized to form an interference type fit with shaft 10 so that the contact between the inner diameter of bearing assembly 12 and the outer diameter of shaft 10 maintains the inner diameter surface of bearing assembly 12 static relative to shaft 10.

Looking at FIG. 2, bearing assembly 12 can include inner race 14 that has the inner diameter surface that is static relative to shaft 10. Bearing assembly 12 further includes outer race 16 and bearing members 18 that are positioned between inner race 14 and outer race 16. Although bearing members 18 are shown as spherical shaped bearing members, bearing members 18 can alternately be cylindrical shaped bearing members. Cage 20 can be used to maintain bearing members 18 appropriately spaced between inner race 14 and outer race 16.

Looking at FIGS. 1-2, if there is a need to remove bearing assembly 12, steam ring assembly 22 can be used to heat bearing assembly 12 and remove dust and debris from bearing assembly 12 and shaft 10 so that a reduced amount of force is required to remove bearing assembly 12 from shaft 10. Steam ring assembly 22 includes steam ring 24. Steam ring 24 is a ring shaped member and can be formed for example, of aluminum, carbon steel, stainless steel, or brass. Steam ring 24 has an inner bore 26 sized to circumscribe shaft 10 so that steam ring 24 can be slid over an end of shaft 10 to meet bearing assembly 12.

Figure 3:
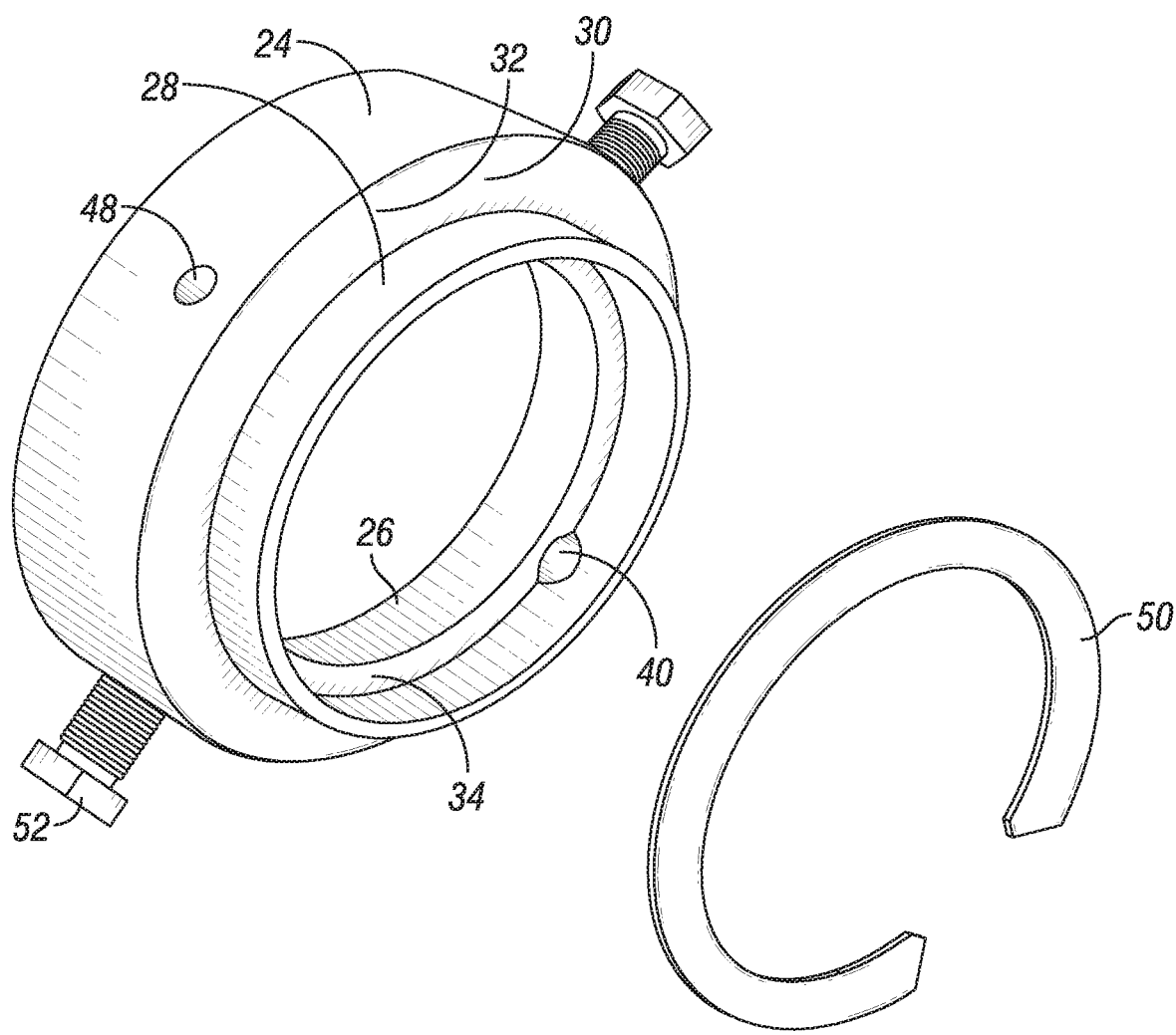
FIG. 3 is a perspective view of a steam ring, in accordance with an embodiment of this disclosure.
Figure 4:
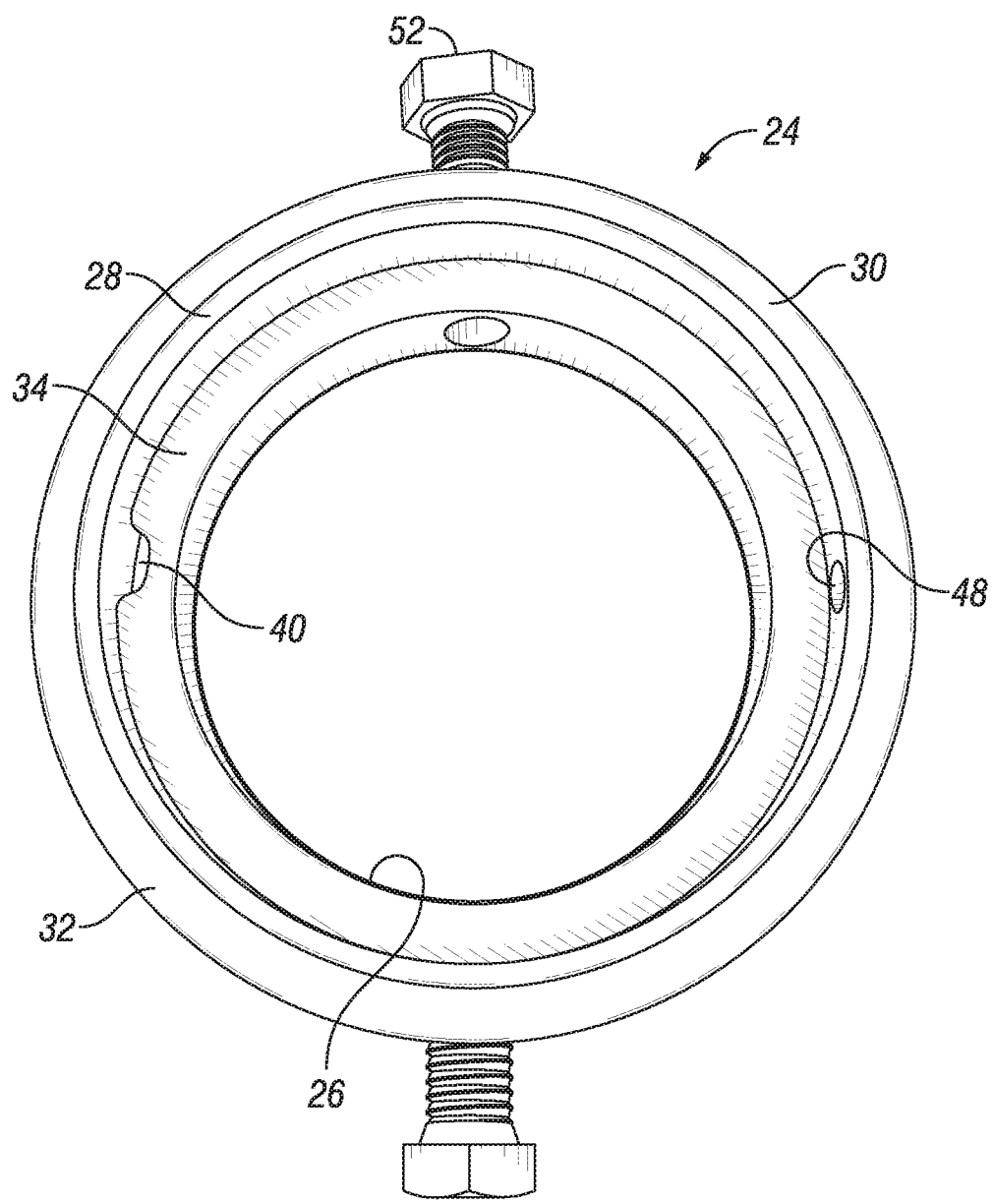
FIG. 4 is a front view of a steam ring, in accordance with an embodiment of this disclosure.

Looking at FIGS. 2-4, steam ring 24 includes lip ring 28. Lip ring 28 extends from first end face 30 of steam ring 24. First end face 30 has outer face surface 32 radially outward of lip ring 28 and inner face surface 34 radially inward of lip ring 28. Outer face surface 32 and inner face surface 34 are unaligned so that lip ring 28 has an inner diameter length 36 that is greater than an outer diameter length 38.

Lip ring 28 and inner face surface 34 define steam circulation path 36. Steam circulation path 36 extends around an inner diameter of steam ring 24. With steam ring assembly 22 located adjacent to bearing assembly 12, steam circulation path 36 is located along inner race 14 of bearing assembly 12.

Steam ring assembly 22 further includes steam inlet port 40. Steam inlet port 40 extends through a sidewall of steam ring 24. Steam inlet port 40 extends from second end face 42 that is opposite first end face 30, and to steam circulation path 36 within inner bore 26. Steam inlet port 40 can be connected to steam source 44 (FIG. 1) to provide a steam to steam inlet port 40 that will then pass through steam circulation path 36. Pressure gauge 46 (FIG. 1) is secured to steam inlet port 40 and can measure a pressure of the steam entering steam inlet port 40.

After passing around steam circulation path 36, the steam can exit steam circulation path 36 through steam outlet port 48. Steam outlet port 48 extends through the sidewall of steam ring 24 at a location spaced apart from steam inlet port 40.

Looking at FIGS. 1 and 3, in order to help maintain steam within steam circulation path 36, seal ring 50 can be positioned around an inner diameter of steam ring 24. Seal ring 50 is sized to contact shaft 10 and form a seal around shaft 10. Seal ring 50 is located around the inner face surface 34. Seal ring 50 can be glued so that seal ring 50 remains in place. Seal ring 50 can be less than a complete circle shape with an open space that allows for steam to be delivered through steam inlet port 40.

In order to maintain the position of steam ring 24 relative to shaft 10, at least one securing member 52 extends through the sidewall of steam ring 24 and engage shaft 10. The securing members 52 engage shaft with sufficient force to prevent relative movement between steam ring 24 and shaft 10. In the example embodiments of FIGS. 3-4 securing members 52 are shown as bolts.

In a test of an example embodiment of steam ring assembly 22, steam ring 24 has an outer diameter of 96 millimeter (mm). Lip ring 28 has an outer diameter of 83.8 mm and an inner diameter of 78.7 mm. Lip ring 28 has an inner diameter length 36 of 12 mm and an outer diameter length 38 of 6 mm. When a bearing assembly was attempted to be removed from a shaft, a pulling force of about 600-700 bar was used and was unsuccessful at removing the bearing assembly from the shaft. Next the steam ring assembly 22 was secured to the shaft with lip ring 28 positioned between the inner and outer race of the bearing assembly and a steam was delivered to the steam ring assembly 22 to heat the inner race. With the inner race heated by the steam, less than 200 bar of pulling force was required to remove the bearing from the shaft.

In an example of operation, in order to remove bearing assembly 12 from shaft 10, shaft 10 can be circumscribed by steam ring 24. Steam ring 24 can be pushed towards bearing assembly 12 until lip ring 28 is located between inner race 14 and outer race 16 of bearing assembly 12. Securing members 52 can then be tightened against shaft 10 to secure steam ring 24 to shaft 10. Steam can be delivered through steam inlet port 40, travel around steam circulation path 36, and exit steam outlet port 48. The pressure of the steam can be monitored with pressure gauge 46. The steam traveling through steam circulation path 36 will contact and heat inner race 14, expanding inner race 14. The steam traveling through steam circulation path 36 can also remove dust and debris from around bearing assembly 12 and shaft 10. Bearing assembly 12 can then be removed from shaft 10.

Embodiments described in this disclosure therefore provide a uniform heating method to ease bearing removal without damaging the bearing assembly or shaft. An open flame is not required, which reduces the risk of fire compared to systems that use a torch to heat bearing.

Embodiments of this disclosure, therefore, are well adapted to carry out the objects and attain the ends and advantages mentioned, as well as others that are inherent. While embodiments of the disclosure has been given for purposes of disclosure, numerous changes exist in the details of procedures for accomplishing the desired results. These and other similar modifications will readily suggest themselves to those skilled in the art, and are intended to be encompassed within the spirit of the present disclosure and the scope of the appended claims.

What is claimed is:

1. A system for removing a bearing assembly from a shaft, the system including:
    a steam ring, the steam ring being a ring shaped member and having:
        an inner bore sized to circumscribe the shaft;
        a lip ring, the lip ring extending from a first end face of the steam ring and having an inner diameter length that is greater than an outer diameter length;
        a steam inlet port extending through a sidewall of the steam ring;
        a steam outlet port extending through the sidewall of the steam ring at a location spaced apart from the steam inlet port; and
        a seal ring, the seal ring positioned around an inner diameter of the steam ring and sized to contact the shaft, the seal ring further positioned to be free of obstruction of the steam inlet port and the steam outlet port.

2. The system of claim 1, where the steam inlet port extends from a second end face of the steam ring opposite the first end face, to the inner bore.

3. The system of claim 1, further including at least one securing member extending through the sidewall of the steam ring and engaging the shaft, preventing relative movement between the steam ring and the shaft.

4. The system of claim 1, further including a pressure gauge secured to the steam inlet port and operable to measure a pressure of a steam entering the steam inlet port.

5. The system of claim 1, further including a steam circulation path extending around an inner diameter of the steam ring.

6. A system for removing a bearing assembly from a shaft, the system including:
    a steam ring, the steam ring being a ring shaped member and having:
        an inner bore circumscribing the shaft;
        a lip ring, the lip ring extending from a first end face of the steam ring, the first end face having an outer face surface radially outward of the lip ring and an inner face surface radially inward of the lip ring, and where the lip ring and the inner face surface define a steam circulation path along an inner race of the bearing assembly;
        a steam inlet port extending through a sidewall of the steam ring to the steam circulation path;
        a steam outlet port extending from the steam circulation path through the sidewall of the steam ring at a location spaced apart from the steam inlet port; and
        a seal ring, the seal ring located around the inner face surface and sized to contact the shaft, the seal ring further positioned to be free of obstruction of the steam inlet port and the steam outlet port; and
    a steam source connected to the steam inlet port.

7. The system of claim 6, where the outer face surface and the inner face surface are unaligned with the lip ring having an inner diameter length that is greater than an outer diameter length.

8. The system of claim 6, further including at least one securing member extending through the sidewall of the steam ring and engaging the shaft, preventing relative movement between the steam ring and the shaft.

9. The system of claim 6, further including a pressure gauge secured to the steam inlet port and operable to measure a pressure of a steam entering the steam inlet port.

10. A method for removing a bearing assembly from a shaft, the method including:
    circumscribing the shaft with a steam ring, the steam ring being a ring shaped member and having:
        an inner bore;
        a lip ring, the lip ring extending from a first end face of the steam ring and having an inner diameter length that is greater than an outer diameter length;
        a steam inlet port extending through a sidewall of the steam ring; and
        a steam outlet port extending through the sidewall of the steam ring at a location spaced apart from the steam inlet port;
    providing steam to the steam inlet port to heat the bearing assembly; and
    sealing an inner diameter of the steam ring with a seal ring positioned around the inner diameter of the steam ring and sized to contact the shaft, the seal ring further positioned to allow for the steam to pass through the steam inlet port and the steam outlet port.

11. The method of claim 10, where the steam inlet port extends from a second end face of the steam ring opposite the first end face, to the inner bore.

12. The method of claim 10, further including preventing relative movement between the steam ring and the shaft with at least one securing member extending through the sidewall of the steam ring and engaging the shaft.

13. The method of claim 10, further including monitoring a pressure of the steam entering the steam inlet port with a pressure gauge secured to the steam inlet port.

14. The method of claim 10, further including providing a steam circulation path extending around an inner diameter of the steam ring, where the steam provided to the steam inlet port travels through the steam circulation path to the steam outlet port.

\* \* \* \* \*